(12) United States Patent
Rozman

(10) Patent No.: US 6,252,751 B1
(45) Date of Patent: Jun. 26, 2001

(54) METHOD AND APPARATUS FOR DISTRIBUTING ALTERNATING ELECTRICAL CURRENT TO MOTORS VIA A DIRECT CURRENT BUS

(75) Inventor: Gregory Z. Rozman, Rockford, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 0 days.

(21) Appl. No.: 09/634,479

(22) Filed: Aug. 8, 2000

Related U.S. Application Data

(62) Division of application No. 09/220,734, filed on Dec. 23, 1998.

(51) Int. Cl.[7] .................................................. H02H 5/00
(52) U.S. Cl. ......................... 361/23; 361/93.1; 361/115; 361/62
(58) Field of Search .......................... 361/23, 93.1, 115, 361/62, 64, 66

(56) References Cited

U.S. PATENT DOCUMENTS

| | | | |
|---|---|---|---|
| 3,790,871 | 2/1974 | Smith | 318/52 |
| 4,106,013 | 8/1978 | Cronin | 340/27 R |
| 4,289,997 | 9/1981 | Jung et al. | 318/113 |
| 4,511,947 | 4/1985 | Melocik et al. | 361/191 |
| 4,669,037 | 5/1987 | Bobry | 363/24 |
| 4,812,729 | 3/1989 | Ito et al. | 318/732 |
| 4,829,217 | 5/1989 | Kameyama et al. | 318/51 |
| 5,040,088 | 8/1991 | Harrington et al. | 361/31 |
| 5,113,684 * | 5/1992 | Oster | 72/448 |
| 5,136,222 | 8/1992 | Yamamoto et al. | 318/568.2 |
| 5,177,657 | 1/1993 | Baer et al. | 361/45 |
| 5,589,743 * | 12/1996 | King | 318/139 |

* cited by examiner

*Primary Examiner*—Stephen W. Jackson
(74) *Attorney, Agent, or Firm*—Marshall O'Toole Gerstein Murray & Borun

(57) ABSTRACT

A method and apparatus for distributing alternating electrical current to motors via a direct current bus is provided. The method and apparatus is directed towards a system wherein a plurality of motors may be controlled by individual motor drives. AC power is supplied to a single active rectifier circuit (as opposed to one per motor) which maintains unity power factor in the AC power and which develops DC power for a DC distribution system. The DC distribution system, which comprises a set of controllable contactors, is in turn coupled to a plurality of motor drive units which convert the DC power into properly conditioned AC power for operating associated motors. The system operates in response to commands issued by a programmable controller. In the event of a fault in one of the drive units, fault isolation may be accomplished by individually turning off each motor drive in sequence via the associated contactor to determine the faulty drive unit. Alternatively, all of the motor drive units may be turned off and then individually turned back on until the fault reappears. Once the fault reappears, the faulty unit is identified and disabled and the remaining units are turned back on. Further, in order to permit smaller contactors to be used, the voltage developed by the active rectifier circuit mat be reduced before the contactors are opened and closed.

4 Claims, 4 Drawing Sheets

METHOD AND APPARATUS FOR DISTRIBUTING ALTERNATING ELECTRICAL CURRENT TO MOTORS VIA A DIRECT CURRENT BUS

This is a divisional of U.S. application Ser. No. 09/220,734, filed Dec. 23, 1998.

TECHNICAL FIELD OF THE INVENTION

The present invention relates in general to distributing alternating current to a plurality of motors and, in particular, to rectifying alternating current to direct current for distribution and fault isolation, and then inverting the direct current to alternating current to drive a plurality of motors.

BACKGROUND OF THE INVENTION

Motor drives are used in a wide variety of applications. Typically, industrial motor drives are designed to accept 60 Hz alternating current (AC) power distribution. Accordingly, each motor drive is connected to a 60 Hz AC bus by input power protection circuitry. The AC power is then rectified and inverted by more circuitry included in each motor drive. Further, power factor correction circuitry is required in each motor drive to maintain a unity power factor.

Prior art solutions have certain drawbacks. Including rectification circuitry, input power protection circuitry, and power factor correction circuitry in each motor drive (including a bulky filters and precharge circuitry), increases size, cost, complexity, and electromagnetic interference. Prior art systems attempt to reduce the electromagnetic interference using filters, but this further increases the system cost.

SUMMARY OF THE INVENTION

Accordingly, a system which reduces duplication of rectification circuitry, input power protection circuitry, and power factor correction circuitry is provided. Systems employing the techniques of the present invention can enjoy reduced electromagnetic interference, reduced conduction losses, reduced size, and lower cost.

In one aspect of the present invention,- an apparatus for distributing a first alternating electrical current to first and second alternating current motors is provided. The apparatus comprises an active rectifier for converting the first alternating electrical current to a direct electrical current. The apparatus further comprises a first motor drive for converting the direct electrical current to a second alternating electrical current to supply the first alternating current motor and a second motor drive for converting the direct electrical current to a third alternating electrical current to supply the second alternating current motor. Still further, the apparatus comprises an electrical bus coupled to the active rectifier, the first motor drive, and the second motor drive for distributing the direct electrical current from the active rectifier to the first and second motor drives.

BRIEF DESCRIPTION OF THE DRAWINGS

These and other features and advantages of the present invention will become more apparent from a detailed consideration of the following detailed description of certain preferred embodiments when taken in conjunction with the drawings in which.

DETAILED DESCRIPTION OF THE PREFERRED EMBODIMENTS

Although the following description focuses on power distribution and fault isolation associated with motors, persons of ordinary skill in the art will readily appreciate that the techniques of the present invention are in no way limited to motors. On the contrary, any system using alternating current loads, which might benefit from direct current distribution and fault isolation, may employ the techniques shown herein.

Figure 1:
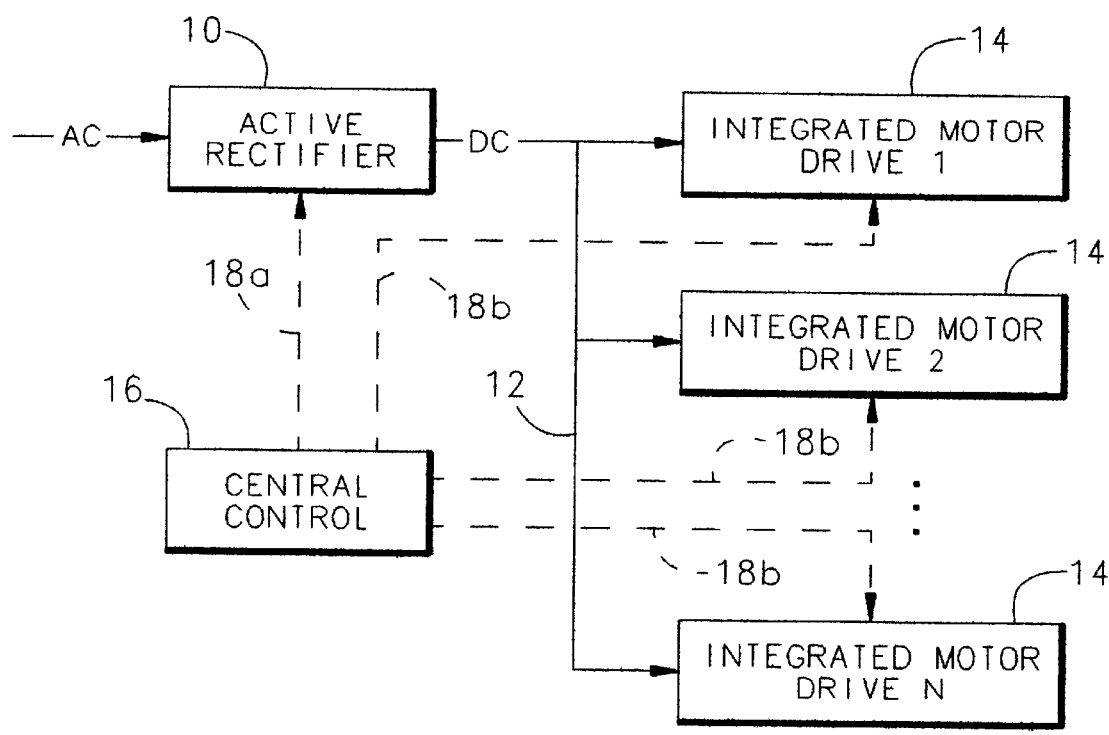
FIG. 1 is a block diagram showing a plurality of integrated motor drives in a direct current distribution system.

A plurality of integrated motor drives coupled to a direct current distribution system is illustrated in FIG. 1. An alternating electrical current (AC) is supplied to the system by conventional means. An active rectifier 10 converts the alternating current into a direct electrical current (DC) using any of several known techniques. For example, the non-regenerative AC-DC converter shown in FIG. 2 may be used to rectify a three-phase, 60 Hertz, 200–480 volt AC input power into 400–600 volt DC power. The direct electrical current is then distributed by a DC bus 12 to each of a plurality of integrated motor drives 14.

A central controller 16 is preferably coupled to each of the integrated motor drives 14 and the active rectifier 10 by a plurality of control lines 18. The central controller 16 may communicate with each of the integrated motor drives 14 individually. Preferably, communication occurs via a serial connection such as an RS-232 connection. Control line 18a may be used to decrease the DC voltage supplied to the integrated motor drives in response to the detection of a fault. Subsequently, control lines 18b may be used to individually turn integrated motor drives 14 on and off in order to isolate the fault. By reducing the DC voltage smaller contactors may be used.

Figure 2:
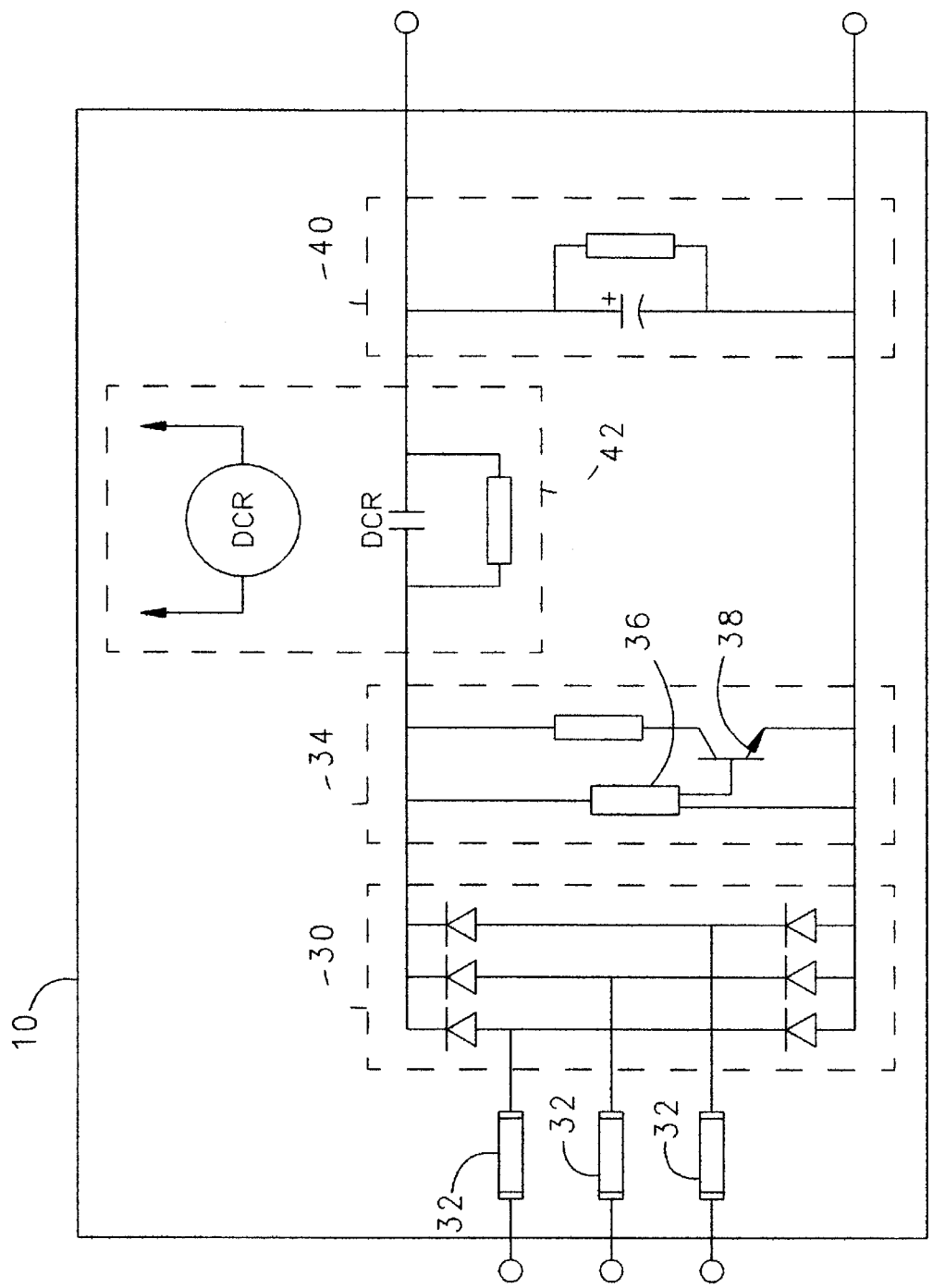
FIG. 2 is a block diagram of a non-regenerative AC-DC converter, suitable for use as the active rectifier of FIG. 1.

The non-regenerative AC-DC converter, suitable for use as the active rectifier 10, is illustrated in more detail in FIG. 2. A rectifier circuit 30 preferably takes three-phase AC and produces a unidirectional output current. Line fuses 32 may be used to protect the circuit from excessive electrical currents. Subsequently, a bus clamp 34 (otherwise known as a dynamic brake) establishes a DC voltage level. For example, a detection circuit 36 of the bus clamp 34 may determine when the voltage exceeds a first predefined threshold and, in response thereto the detection circuit 36 closes a switch 38, thereby rerouting some of the current and reducing the voltage. Conversely, the detection circuit 36 opens the switch 38 when the voltage falls below a second predefined threshold. The first predefined threshold may be equal to the second predefined threshold, or the first predefined threshold may be higher than the second predefined threshold, thereby providing hysteresis.

Typically, a DC bus filter 40 with pre-charge control relay 42 is used to smooth the developed DC output. For large horsepower drives, such as a spindle drive, a regenerative front-end is used to save energy by returning excess energy back to the line. This may be achieved by a phase-controller bridge and two power switches which are operated to return power to the DC bus during regeneration.

Figure 3:
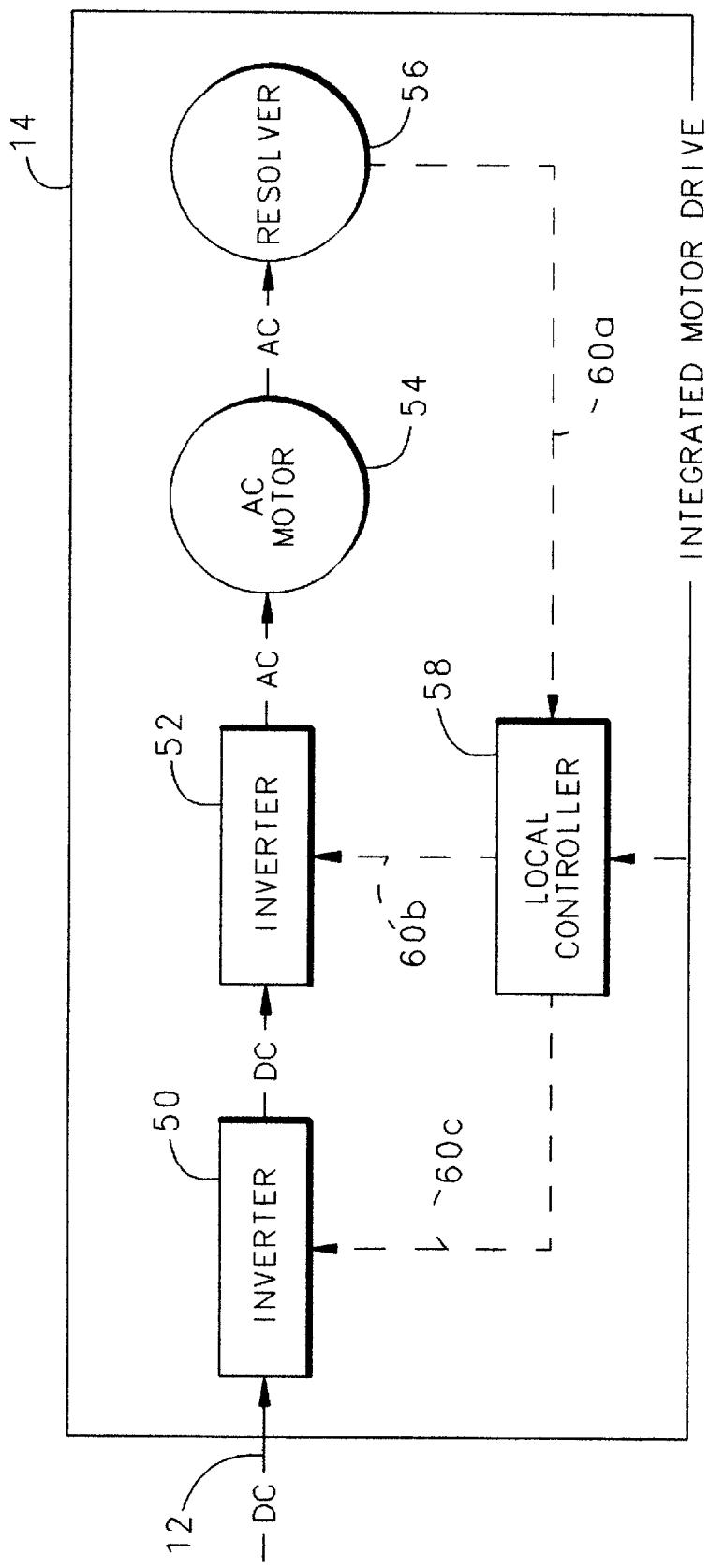
FIG. 3 is a block diagram showing one of the integrated motor drives of FIG. 1.

A block diagram of one of the integrated motor drives 14 is illustrated in more detail in FIG. 3. The DC produced by the active rectifier is preferably coupled to the integrated motor drive 14 via a contactor 50. The contactor 50 may be open, thereby disconnecting the integrated motor drive 14 from the DC distribution system, or the contactor 50 may be closed. Preferably, DC power is reduced prior to opening and closing the contactors, thereby permitting smaller contactors to be used. When the contactor 50 is closed, DC preferably passes to an inverter 52. The inverter 52 converts the DC back into AC in a known manner. An AC motor 54 is powered by the converted AC. Preferably, a resolver 56 is coupled to the AC motor 54. The resolver 56 contains a rotor which is mechanically driven to produce electronic information corresponding to the sine and cosine of the rotor angle. This information is then sent to a local controller 58 via a control line 60a. The local controller 58 preferably adjusts the inverter 52 in response to the angle information from the resolver 56 via a control line 60b in order to maintain synchronization.

Further, the local controller 58 may receive instructions from the central controller 16. The central controller 16 may instruct the local controller to adjust the speed of the motor 54. In such an instance the local controller 58 adjusts the inverter 52 via the control line 60b. Similarly, the central controller 16 may instruct the local controller 58 to turn the integrated motor drive 14 on and off by closing or opening the contactor 50 via a control line 60c. Preferably, these commands are sent by the central controller 16 to the local controller 58 via the control line 18a (e.g., serial connection such as an RS-232 connection). By systematically turning individual integrated motor drives 14 on and off, the central controller 16 may determine which, if any, of the integrated motor drives 14 is the source of a fault condition.

Figure 4:
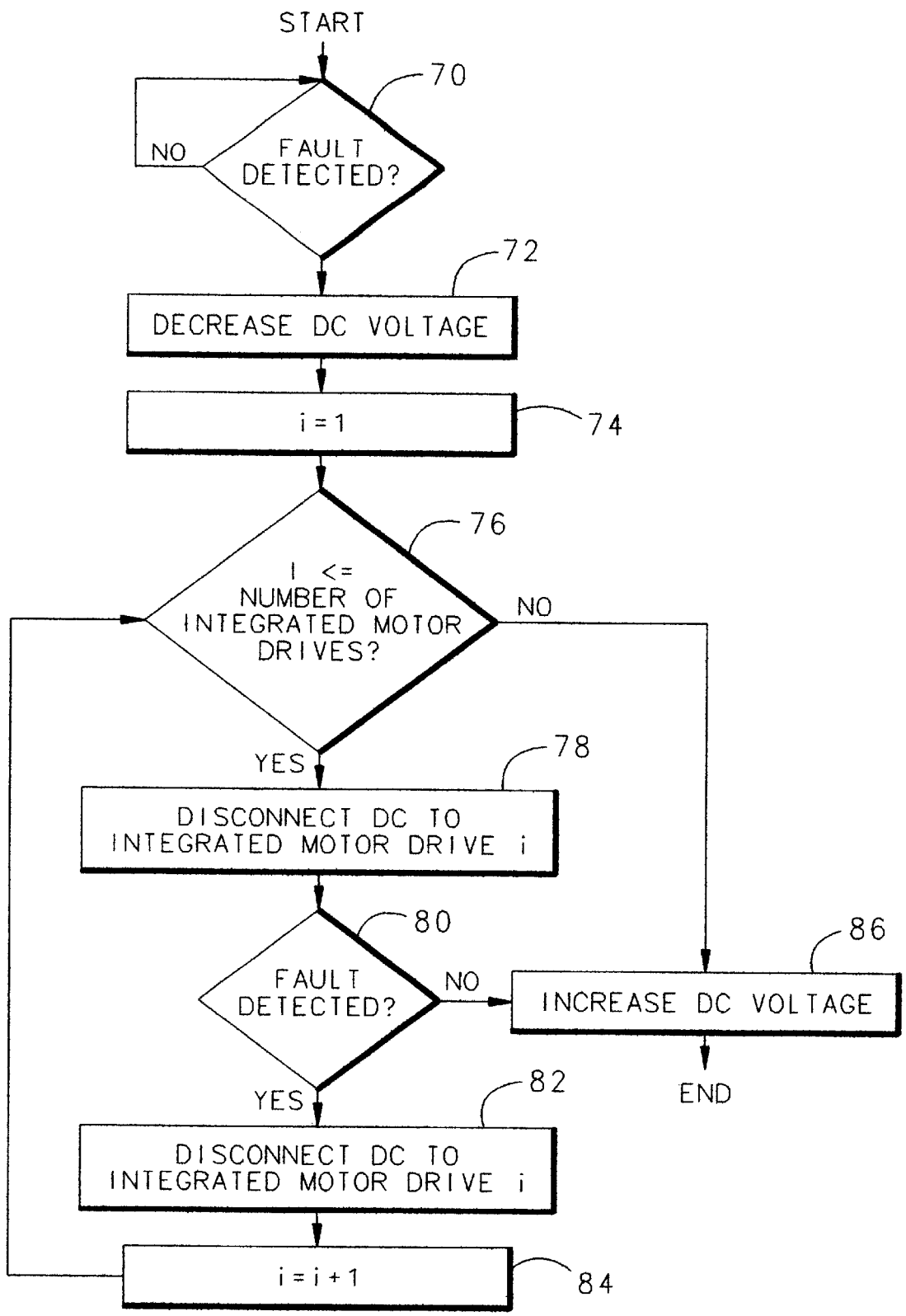
FIG. 4 is a flowchart illustrating a program for isolating a fault in the plurality of integrated motor drives of FIG. 1.

A flowchart of a program that can be implemented by the central controller 16 to isolate faults in accordance with the teachings of the present invention is illustrated in FIG. 4. Once the program is initiated the central controller 16 waits for a fault to be detected (block 70). Typically, a fault is detected by sensing an amount of current being drawn that exceeds a predefined threshold representing an overcurrent condition. In this event, the central controller 16 sends a signal to the active rectifier 10 via control line 18a to decrease the DC voltage distributed by the DC bus 12 (block 72). Each of the integrated motor drives 14 is then turned off by opening the associated contactor to determine if it is the source of the fault. By reducing DC power prior to opening the contactors, smaller contactors may be used.

In order to keep track which one of the plurality of integrated motor drives 14 is currently being tested, the central controller 16 initializes a variable (block 74). Each time through a loop, the central controller 16 compares the variable to the overall number of integrated motor drives 14 to determine if all of the integrated motor drives 14 have been tested (block 76). If all of the integrated motor drives 14 have not been tested, the central controller 16 preferably sends a "disconnect" signal to the local controller 58 associated with the integrated motor drive 14 currently being tested (block 78).

After receiving and decoding the "disconnect" signal, the local controller 58 sends an "open" signal to the contactor 50 via control line 60c. The contactor 50 then opens, causing the current integrated motor drive 14 to be isolated from the DC bus 12 and all the other integrated motor drives 14. If the current integrated motor drive 14 is the source of the fault, the fault condition should go away when the integrated motor drive 14 is disconnected.

Accordingly, the central controller 16 then determines if the fault is still detected (block 80). If the fault is still detected, the central controller 16 restores DC to the current integrated motor drive 14 by sending a "connect" signal to the local controller 58 (block 82), which in turn sends a "close" signal to the contactor 50. Subsequently, the central controller 16 increases the variable being used to keep track which one of the plurality of integrated motor drives 14 is currently being tested (block 84), and loops back to block 76 to determine if all of the integrated motor drives 14 have been tested.

If the fault is no longer detected at block 80, the central controller 16 restores the DC voltage and exits (block 86). Similarly, if all of the integrated motor drives 14 have been tested (block 76), the central controller 16 restores the DC voltage and exits (block 86). Alternatively, all of the motor drive units may be turned off and then individually turned back on until the fault reappears. Once the fault reappears, the faulty unit is identified and disabled and the remaining units are turned back on.

In summary, persons of ordinary skill in the art will readily appreciate that a method and apparatus for distributing alternating electrical current to motors via a direct current bus and isolating faults has been provided. Systems implementing the teachings of the invention can enjoy reduced electromagnetic interference, reduced conduction losses, reduced size, and lower cost.

The foregoing description has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

What is claimed is:

1. An apparatus for distributing a first alternating electrical current to first and second alternating current motors comprising:

an active rectifier for converting the first alternating electrical current to a direct electrical current;

a first motor drive for converting the direct electrical current to a second alternating electrical current to supply the first alternating current motor;

a second motor drive for converting the direct electrical current to a third alternating electrical current to supply the second alternating current motor;

an electrical bus coupled to the active rectifier, the first motor drive, and the second motor drive, the electrical bus distributing the direct electrical current from the active rectifier to the first and second motor drives;

a contactor selectively connecting the first motor drive to the electrical bus; and a controller operatively coupled to the electrical bus and the contactor, the controller including, circuitry that reduces a voltage on the electrical bus and opens the contactor to isolate the first motor drive from the electrical bus in response to a fault condition.

2. An apparatus as defined in claim 1, wherein the first motor drive further comprises an inverter for converting the direct electrical current to the second alternating electrical current.

3. An apparatus as defined in claim 2, wherein the first motor drive further comprises:

a resolver coupled to the first alternating current motor for translating a rotor angle to a digital signal; and, a controller coupled to the resolver and the inverter for adjusting the second alternating electrical current based on inputs from the resolver.

4. An apparatus as defined in claim 1, further comprising a controller coupled to the first and second motor drives for selectively turning one of the motor drives off.

* * * * *